United States Patent
Eschbach et al.

(10) Patent No.: US 8,699,089 B2
(45) Date of Patent: Apr. 15, 2014

(54) VARIABLE DATA IMAGE WATERMARKING USING INFRARED SEQUENCE STRUCTURES IN BLACK SEPARATION

(75) Inventors: Reiner Eschbach, Webster, NY (US); Zhigang Fan, Webster, NY (US); Martin E. Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 91 days.

(21) Appl. No.: 13/553,338

(22) Filed: Jul. 19, 2012

(65) Prior Publication Data

US 2014/0022603 A1 Jan. 23, 2014

(51) Int. Cl.
*H04N 1/40* (2006.01)

(52) U.S. Cl.
USPC .......................................... 358/3.28; 358/1.9

(58) Field of Classification Search
CPC .................................................... G06K 15/189
See application file for complete search history.

(56) References Cited

U.S. PATENT DOCUMENTS

| | | | |
|---|---|---|---|
| 5,734,752 | A | 3/1998 | Knox |
| 7,852,515 | B2 | 12/2010 | Eschbach et al. |
| 8,064,102 | B1 | 11/2011 | Zhao et al. |
| 2008/0302263 | A1 | 12/2008 | Eschbach et al. |
| 2008/0305444 | A1 | 12/2008 | Eschbach et al. |
| 2009/0262400 | A1 | 10/2009 | Eschbach et al. |
| 2010/0214595 | A1 | 8/2010 | Chapman et al. |
| 2011/0127331 | A1 | 6/2011 | Zhao et al. |
| 2012/0140290 | A1 | 6/2012 | Eschbach et al. |
| 2012/0218608 | A1 | 8/2012 | Maltz et al. |

OTHER PUBLICATIONS

R. Gold, "Optimal Binary Sequences for Spread Spectrum Multiplexing", IEEE Transactions on Information Theory, 13(4) pp. 619-621, Feb. 1967.

*Primary Examiner* — Firmin Backer
*Assistant Examiner* — Christopher D Wait
(74) *Attorney, Agent, or Firm* — Fay Sharpe LLP (57) ABSTRACT

An image watermarking method includes a color transform on RGB image data to derive CMYK image data that define a constant K image. Variable infrared (IR) mark data defining an IR mark are received and a sparse two-dimensional pattern of black pixels is defined that corresponds to the variable IR data, e.g., using Gold codes or pseudorandom binary sequences. A watermarked black separation K" is defined by embedding the sparse two-dimensional pattern into the constant K black separation K' while maintaining local average levels. A watermarked image includes the watermarked black separation K" in combination with the CMY separations of the constant K image. A decoding process includes using an IR microscope fitted with IR LEDs and an IR pass filter to capture an IR image, which is subjected to exposure correction, thresholding, and dilation operations to extract the two-dimensional pattern for subsequent correlation processing.

19 Claims, 6 Drawing Sheets

VARIABLE DATA IMAGE WATERMARKING USING INFRARED SEQUENCE STRUCTURES IN BLACK SEPARATION

BACKGROUND

Security is an important concern in the realm of digital production and/or reproduction of documents. Known digital image printing/copying systems produce documents of such high quality that a need has been identified to prevent effective printing/copying of certain documents such as high-value printed items including tickets, financial instruments, security ID badges, and the like. Known techniques include printing the original document in a manner such that it includes a digital "watermark" using only conventional paper and toner or ink. A digital watermark in a broad sense can be defined as information, for example one or more letters, words, symbols or patterns, that is at least partially (preferably fully or at least substantially) hidden in a printed image under normal viewing conditions but that is more clearly discernible under certain specialized viewing conditions. Unauthorized reproduction of documents including such digital watermarks typically degrades or obscures the digital watermark, which can aid in detection of counterfeit documents.

Methods and systems are known for including infrared (IR) marks in printed documents using conventional papers and ordinary inks/toners (e.g., CMYK ink/toner) by using metameric colorant mixtures. Under visible lighting conditions, the different metameric colorant mixtures that are printed on respective adjacent portions of the paper together define an overall printed document region that appears substantially uniform in color. Under infrared (IR) lighting (e.g., electromagnetic radiation wavelengths longer than 700 nm but shorter than microwaves), these different colorant mixtures exhibit different IR absorption/transmission and, thus, different suppression of IR reflectance from the paper or other substrate on which the colorants are printed. The region printed with the colorant mixture that absorbs less (transmits more) IR appears as a lighter/brighter region while the adjacent area printed with the colorant mixture that absorbs more (transmits less) IR appears as a darker region. These contrast variations under IR lighting are used to create watermark-like patterns, e.g., numbers, letters, symbols, shapes, that can be observed using an IR camera or other IR sensor/imaging device.

Figure 1:
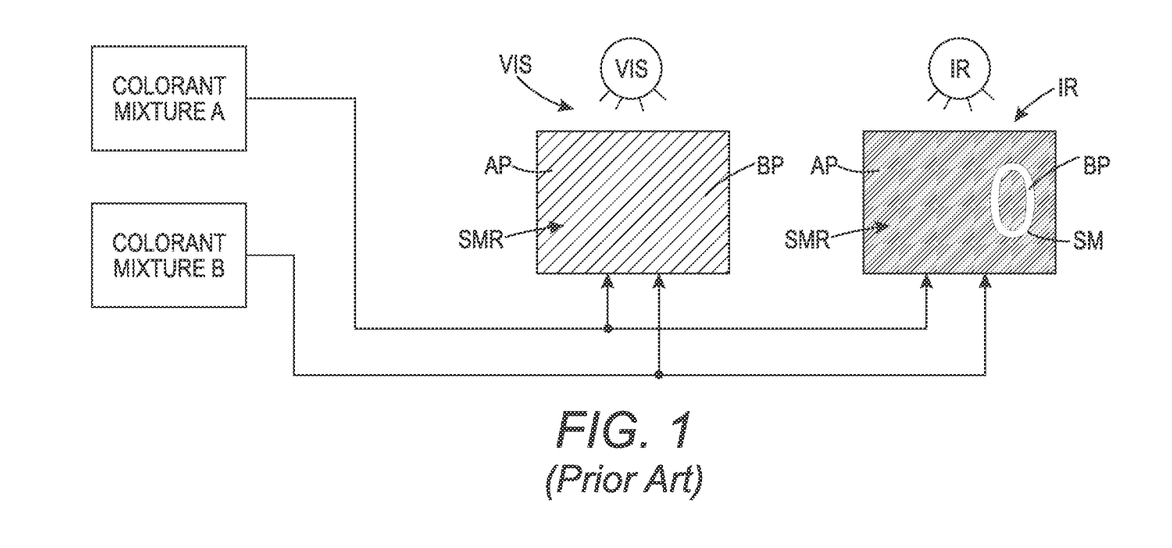
FIG. 1 (prior art) diagrammatically discloses the inclusion of an IR security mark in a printed document using metameric colorant mixtures.

An example of the above IR mark method is shown in FIG. 1, wherein a colorant mixture "B" is selected and applied to patch area BP which, in this example, is shaped as the alphanumeric symbol "0". Further, a colorant mixture "A" is selected and applied to patch area AP arranged here in substantially close spatial proximity to patch area BP, and thereby providing a background around patch area BP. The patch areas AP and BP together define a security mark region SMR. Both colorant mixture A and colorant mixture B are comprised of one or more suitably selected colorants, but colorant mixtures A and B are different mixtures. In the illustrated example, colorant mixture A is selected to provide greater IR absorption (less IR transmission) and greater substrate IR reflectance suppression as compared to colorant mixture B. The colorant mixtures A and B will also be selected to match each other closely in their average color and luminance when viewed under visible light conditions. As shown at IR in FIG. 1, under IR lighting conditions, patch BP will appear brighter as compared to patch AP to define a security mark SM, due to the relatively high transmission of IR in the region BP leading to an increased IR reflectance from the paper substrate as compared to the region AP that has a relatively high absorption of IR and corresponding decrease in IR reflectance from the paper substrate. In contrast, under visible light conditions as shown at VIS, patches AP, BP are at least substantially indistinguishable. This property of matching color under a first lighting condition (e.g., visible light) but unmatched color under a second lighting condition (e.g., IR) is referred to as metamerism and the colorant mixtures A and B can be said to define a metameric or approximately metameric pair.

Additional details relating to infrared marks are disclosed in U.S. Patent Application Publication No. 2008/0305444 (application Ser. No. 11/758,359 filed Jun. 5, 2007) in the name of Reiner Eschbach, Raja Bala, and Martin Maltz and entitled "Infrared Encoding of Security Elements Using Standard Xerographic Materials with Distraction Patterns" and in U.S. Patent Application Publication No. 2008/0302263 (Ser. No. 11/758,344 filed Jun. 5, 2007) in the name of Reiner Eschbach, Raja Bala, and Martin Maltz and entitled "Infrared Encoding of Security Elements Using Standard Xerographic Materials" and in U.S. Patent Application Publication No. 2009/0262400 (application Ser. No. 12/106,709 filed Apr. 21, 2008) in the name of Reiner Eschbach and Martin Maltz and entitled "Infrared Watermarking of Photographic Images by Matched Differential Black Strategies," and the entire disclosure of each of these prior applications is hereby expressly incorporated by reference into the present specification.

It has been deemed highly desirable to include variable IR mark data in a printed document in real time before the document is printed such that the IR mark encodes information that is unique to each particular document occurrence or a series of document occurrences. As an example, it would be desirable to embed a particular encoded number sequence in a printed document that matches a visible number sequence printed on the document when the visible number sequence changes for each occurrence of the printed document. As such, the document could be verified by ensuring that the IR mark matches the visible number sequence. While known methods have allowed for variable IR marks to be included in solid color regions, a need has been identified for a new and improved method for including variable IR marks efficiently and effectively on a real-time basis into photographic and other variable image data in which the image data does not present a region of uniform color that can be used to include an IR mark using metameric color pairs as noted above.

SUMMARY

In accordance with one aspect of the present development, a variable data image watermarking method includes receiving input image data that define an input image in terms of RGB data defining a red (R) color separation, a green (G) color separation, and a blue (B) color separation, and performing a color transform on the RGB data to derive a CMYK image including a cyan (C), magenta (M), yellow (Y) and black (K) separation. The color transform provides a constant K image that corresponds in appearance to the input image and that includes a constant K black color separation K'. The method also includes receiving variable infrared (IR) mark data defining an IR mark to be embedded in the constant K image, and defining a watermarked black separation K" by embedding a sparse two-dimensional pattern of black pixels into the constant K black separation K', wherein the sparse two-dimensional pattern of black pixels corresponds to the received variable IR mark data. The method further includes correcting the local neighborhood values in the watermarked black separation K" excluding the black pixels corresponding to the received variable IR mark to maintain local average black levels. The color transformed cyan, magenta, and yellow color separations C, M, Y and the watermarked black separation K" define a watermarked image. A watermarked document is generated by printing the watermarked image on paper using a multicolorant printer.

DETAILED DESCRIPTION

Figure 2:
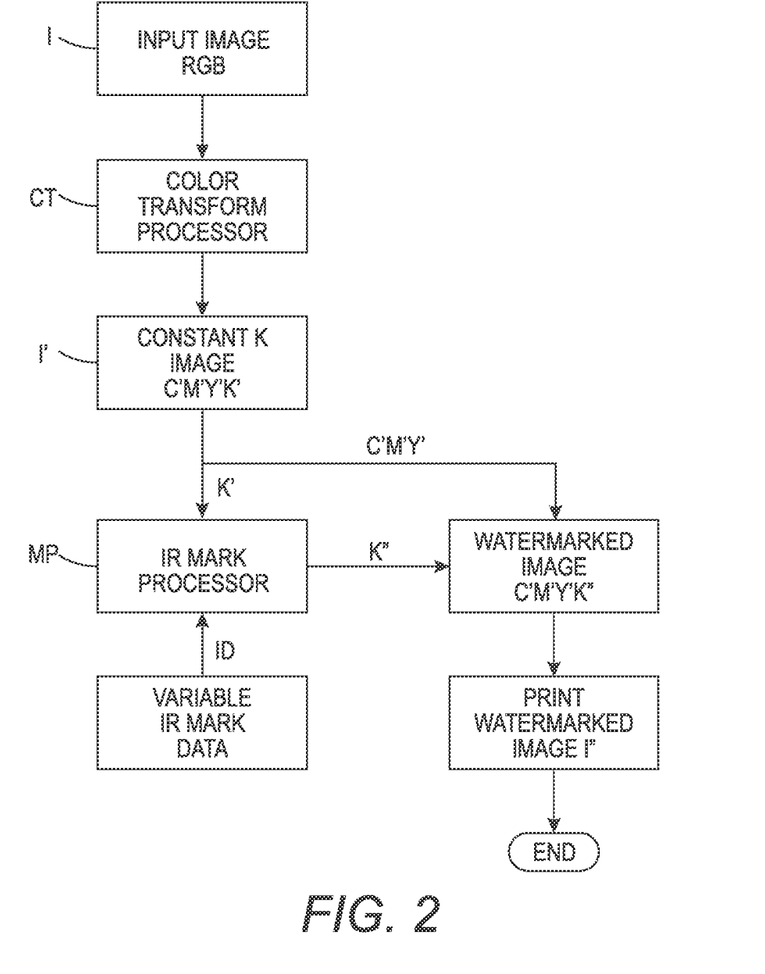
FIG. 2 illustrates a variable data image watermarking system and method in accordance with one embodiment of the present development.

FIG. 2 illustrates a variable data image watermarking system and method in accordance with one embodiment of the present development. An input digital image I such as a photograph or other image including variable color data and variable luminance data (i.e., not simply a solid color region) is defined by input image data comprising a red image separation R, a green image separation G and a blue image separation B, or any other common three component color description that can be directly converted to RGB. In standard CMYK printing, this image is transformed to a data set comprised of a cyan separation C, a magenta separation M, a yellow separation Y and a black or key separation K. This non-unique transformation is common in the vast majority of color printing systems for a variety of reasons, including but not limited to printability, material cost, color gamut, etc. In some cases, an even larger number of separations, e.g.: five or six, are used. Here and in the following, we will describe the case for four separations CMYK, but it is understood that the described method can be extended to more separations. We also assume herein that at least one of the separations has an infrared IR characteristic distinct from the other separations. In common printing systems this is equivalent to the K separation where most black colorants in use have a strong absorption in the IR. Other systems are envisionable specifically if more than four separations are used. But a basic assumption of this invention is that the infrared distinct separation is used in the printing of a color image and not available as special material that is only used for infrared. This double use of a separation for printing and infrared encoding is assumed in the subsequent description.

The individual monochromatic C, M, Y, K image separations are combined to define the overall color input image I as is known in the art. In particular, each of the CMYK separations defines a monochromatic image in which a matrix of n rows and m columns of pixels is defined. Each pixel of each monochromatic separation is defined in terms of a bit depth of d bits per pixel (e.g., 8), such that each pixel has a "gray" value inclusively between full off and full on (e.g., a range of 0-255 for d=8). When the CMYK separations are combined, a final n×m image results from the combined color values at each corresponding spatial location in the matrix.

The RGB data defining the input image I are input to a color transform processor CT that performs a color transform operation to the C, M, Y, K data and that outputs a "constant K" image I', where the constant K image I' at least substantially corresponds in appearance to the input image I when viewed by a human observer with a naked eye in visible light.

More particularly, the color transform processor CT converts the image I using a "constant K" black image separation K' in which the average black (K) level is equal to a select threshold percentage T over all areas thereof. Thus, over any given area of the constant K black image separation K', the average black (K) level will be equal to T, which can be expressed as $K'_{AVG}=T$. The usable threshold T varies inclusively between 5% and 25% such that $5\% \leq T \leq 25\%$ and is programmable by a user.

It is understood that the constant K image might be a subset of a larger image. In that case, all image areas that have a sufficient color level to allow a K inclusion are deemed to be a new image. For example, all image areas that would be rendered with a UCR/GCR (undercolor removal/gray component replacement) of K>=T in standard processing are now rendered using K=T.

In conjunction with defining the constant K black image separation K', the C, M, and Y color separations must be accordingly defined by the color transform processor CT such that the input RGB image I and the new constant K image I' are approximately equal in terms of visual appearance to a human observer, i.e., I≈I'. This means that most human observers would indicate that the image I and the image I' are at least approximately the same image when printed. In one example, the constant K separation K' required for the present development is derived as disclosed in commonly owned U.S. patent application Ser. No. 13/034,867 filed Feb. 25, 2011 entitled "IR Specialty Imaging Methods and Systems," and the entire disclosure of said application Ser. No. 13/034,867 is hereby expressly incorporated by reference into the present specification.

With continuing reference to FIG. 2, the variable data image watermarking system and method in accordance with the illustrated embodiment of the present development further comprises an IR mark processor MP for embedding variable IR mark data defining an IR mark in the image data defining the constant K image I'. The IR mark processor MP thus receives as input at least (and optionally only) the black separation K' of the constant K image I'. Generating a constant K image allows a real-time infrared marking procedure that cannot be obtained through the switching of various RGB to CMYK metameric transforms, as described in the above-identified U.S. patent application Ser. No. 13/034,867. For the present development, a constant K image can be used through the local modification of the constant K image so that the K amount varies locally, yet stays constant when integrated over a small area, where the small area is generally smaller than any relevant image detail, for example $\frac{1}{50}$ or $\frac{1}{100}^{th}$ of an inch.

The IR mark processor receives as input variable IR mark data ID defining the IR mark to be embedded in the constant K image I', wherein the variable IR mark data ID is preferably provided in the form of a numerical code or sequence such as a pseudorandom binary sequence. As described in more detail below, the IR mark processor MP is operative to generate a sparse two-dimensional sequence or two-dimensional pattern of black pixels corresponding to the input numerical sequence and to embed the sparse pattern into the black separation K' of the constant K image I' such that a watermarked black separation K" is defined and output by the IR mark processor MP. Consequently, the 100% K amount locally is balanced in proximity by reducing the K amount of pixels having K=T. Alternatively, the variable IR mark data ID directly defines the sparse two-dimensional pattern of black pixels to be embedded into the black separation K' of the constant K image I' in the case where the two-dimensional pattern has been predefined elsewhere. In either case, a watermarked image I" is defined by the separations C', M', Y' of the constant K image together with the watermarked black separation K" output by the IR mark processor MP, i.e., the watermarked image I" is defined by the C',M',Y',K" separations.

Figure 3:
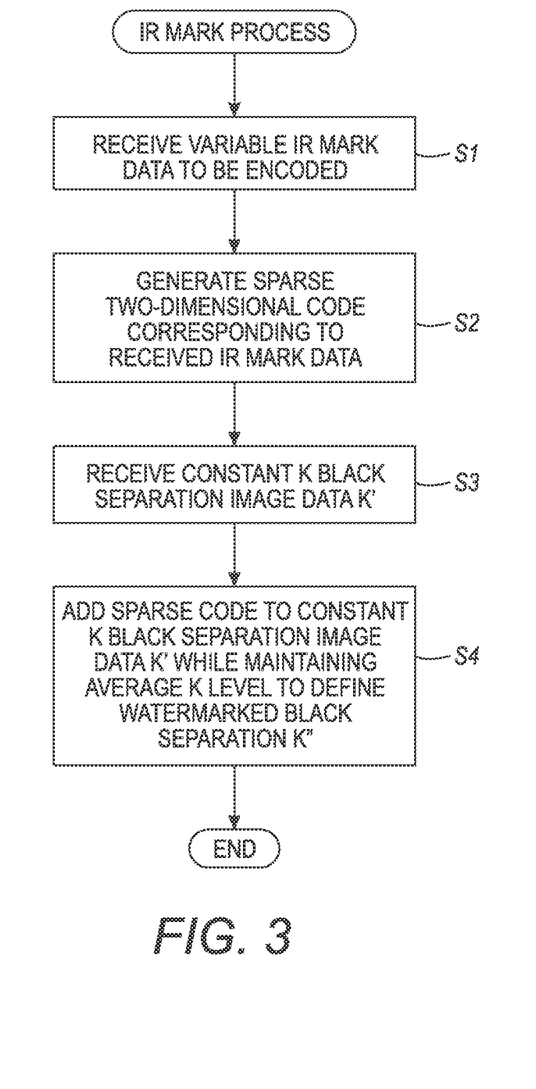
FIG. 3 is a flow chart that discloses a process implemented by the IR Mark Processor of FIG. 2 to embed a variable IR mark in image data according to one embodiment of the present development.

FIG. 3 illustrates the IR mark process as performed by the IR mark processor MP in more detail. In a step S1, the IR mark processor MP receives variable IR mark data ID defining a numerical sequence to be encoded as an IR mark. In a step S2, the IR mark processor MP generates a sparse two-dimensional sequence or pattern or bitmap corresponding exactly to the input numerical sequence received in step S1. Every numerical sequence to be encoded corresponds exactly to one particular sparse two-dimensional pattern or bitmap. In one embodiment, the IR mark processor MP receives a pseudorandom binary sequence as the input data ID and performs the step S2 to derive a sparse code defined by a two-dimension pattern of black or "on" pixels to be embedded into the black separation K' of the constant K image I'. The sparse two-dimensional pattern preferably exhibits the following properties:

maximized autocorrelation
minimized crosscorrelation
sparse pixel count,
toroidal periodicity as explained below.

These properties are exhibited by Gold codes (see R. Gold, "Optimal Binary Sequences for Spread Spectrum Multiplexing," IEEE Transactions on Information Theory, 13(4), pp. 619-621 (1967), which is hereby expressly incorporated by reference in its entirety into the present specification), wherein each Gold code is represented by a sparse bitmap having a density of "on" or black pixels relative to "off" or white pixels of ≤T.

In one embodiment, the input data ID comprises a binary number or sequence that corresponds to a visible printed number or number sequence that is to be printed on the document being printed. In such case, the IR mark processor generates a two-dimensional pattern or bitmap that corresponds to the visual number or number sequence.

In a step S3, the IR mark processor MP receives the black separation K' of the constant K image I'. In a step S4, the IR mark processor combines the sparse code derived in step S2 with the black separation K' of the constant K image I' received in step S3 to define the watermarked black separation K" of the watermarked image I" wherein the local neighborhood is balanced to yield SUM(K')=SUM(K") over the neighborhood according to:

$$\Sigma_{neighborhood} K' = \Sigma_{neighborhood} K''$$

For example, consider location [x,y] to be the location of a K"=100% and K'=20%. In that case balancing can be performed by setting K[x−1,y]=K[x+1,y]=K[x,y−1]=K[x,y+1]=0. The increase in K" by 80% in this illustrative example is balanced by the decrease in K" at four neighboring pixel.

Performing this operation on the K separation only, allows a fast, real time implementation that does not need to modify the other color components, which is a comparatively slower process.

Figure 4A:
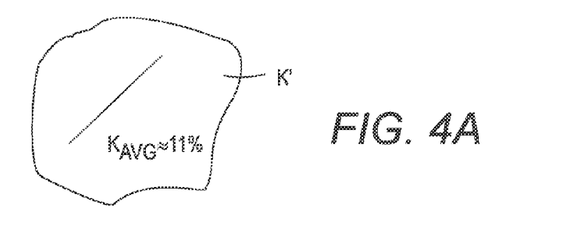
FIGS. 4A, 4B, and 4C diagrammatically disclose a process for adding a sparse code to a black separation while maintaining a constant average K level.
Figure 4B:
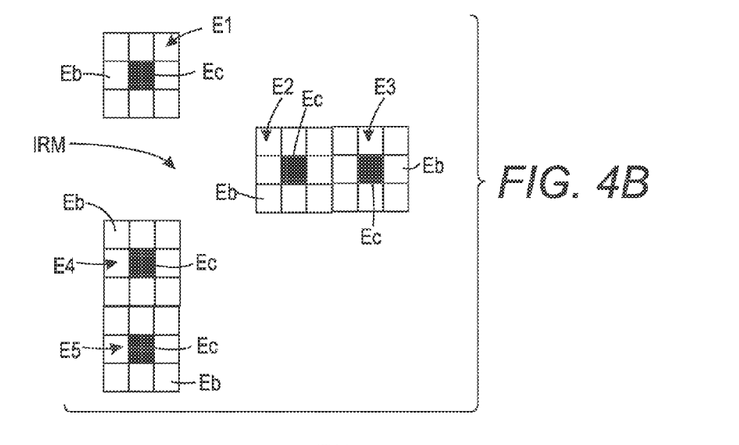
Figure 4C:
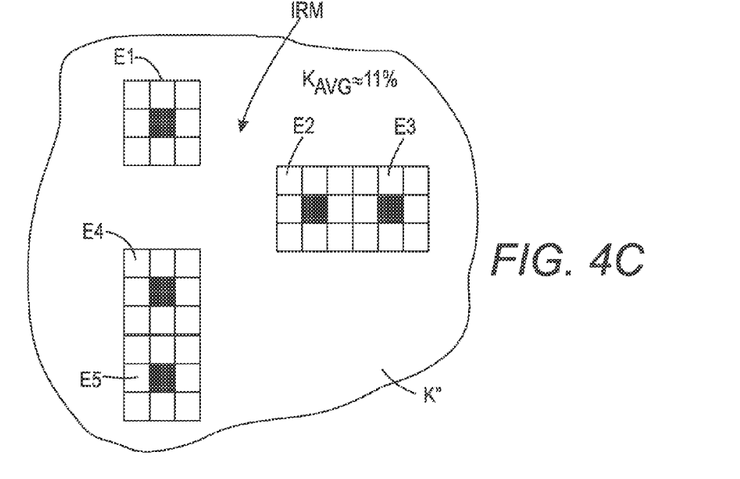

It is an observation of this invention that over small neighborhoods as mentioned earlier, a sufficient color stability is obtained when the K separation is modified in the described way. This is further illustrated in FIG. 4.

FIGS. 4A-4C illustrate an example of a method implemented by the IR mark processor MP to combine the sparse code derived in step S2 with the black separation K' of the constant K image I'. In this example, the black separation K' of the constant K image I' has been defined by the color transform processor CT to have an average density $K_{AVG} \approx 11\%$ as shown in FIG. 4A. FIG. 4B shows a greatly enlarged infrared mark portion IRM to be embedded into the black separation K'. The infrared mark portion IRM comprises a plurality of elements E1-E5 each comprising at least one black central "on" pixel Ec surrounded by a border Eb of white "off" pixels that provide contrast to the black central "on" pixels. The elements E1-E5 together define a pattern or bitmap that represents a complete encoded number or numerical sequence received as input in the step S1 or derived from the input received in step S1 (e.g., using Gold codes or other binary sequences), and the IR mark portion IRM is repeated identically in a toroidal pattern when embedded throughout the black separation K' in both horizontal and vertical directions, wherein the period of the toroidal pattern is less than the field of view of an IR mark viewing microscope or other IR mark viewing device such that at least one complete IR mark portion IRM is always contained within the field of view of the IR mark viewing device. The IR mark viewing device comprises a field of view having horizontal and vertical dimensions, and the period of the toroidal periodic pattern in said horizontal direction is less than said horizontal field of view dimension, and said period of said toroidal periodic pattern in said vertical direction is less than said vertical field of view dimension. A complete infrared mark is defined by a plurality of the IR mark portions IRM arranged in the noted toroidal periodic manner.

FIG. 4C shows the watermarked black separation K" defined by embedding the IR mark portion IRM in the constant K black separation K'. All pixels of the constant K black separation K' located in a spatial position that corresponds to the spatial position where an element E1-E5 of the IR mark portion IRM is embedded into the constant K separation K' are replaced or overwritten by the entire structure of the elements E1-E5. This ensures that any black or "on" pixels already defined in the constant K black separation K' and respectively located where the elements E1-E5 are to be included are replaced by the respective elements E1-E5 and do not interfere with the black or "on" pixels Ec of the IR mark portion IRM, with the result that the central "on" or black pixel(s) Ec of each element E1-E5 are defined with high contrast relative to the surrounding border pixels of the element E1-E5 which facilitates later decoding of the IR mark portion IRM. As noted, the black separation K' of the constant K image includes background (white) areas where the pixels are "off" and includes foreground or black areas where the pixels are "on" such that the "on" (black) pixels cover or have a density of about 11% of the total area of the image K black separation K'. To preserve this density in the watermarked black separation K", the elements E1-E5 of the IR mark portion IRM likewise define a black or "on" pixel density that matches or at least approximates the density of the black separation K' (i.e., the density of the element E1≈threshold T) such that when the IR mark processor MP embeds the elements E1-E5 in the black separation K' the density of "on" (black) pixels in the black separation K' is at least approximately unchanged, i.e., the density of "on" (black) pixels in the black separation K' at least approximately equals the density of the "on" (black) pixels in each IR mark element E1. In this context, the black pixel density of an element E1-E5 is approximately equal to the threshold T if it is within plus or minus 10% of the threshold T. This helps to ensure that the embedded IR mark portion IRM does not negatively impact the quality of the overall marked image I" as compared to the constant K image I'.

Figure 5:
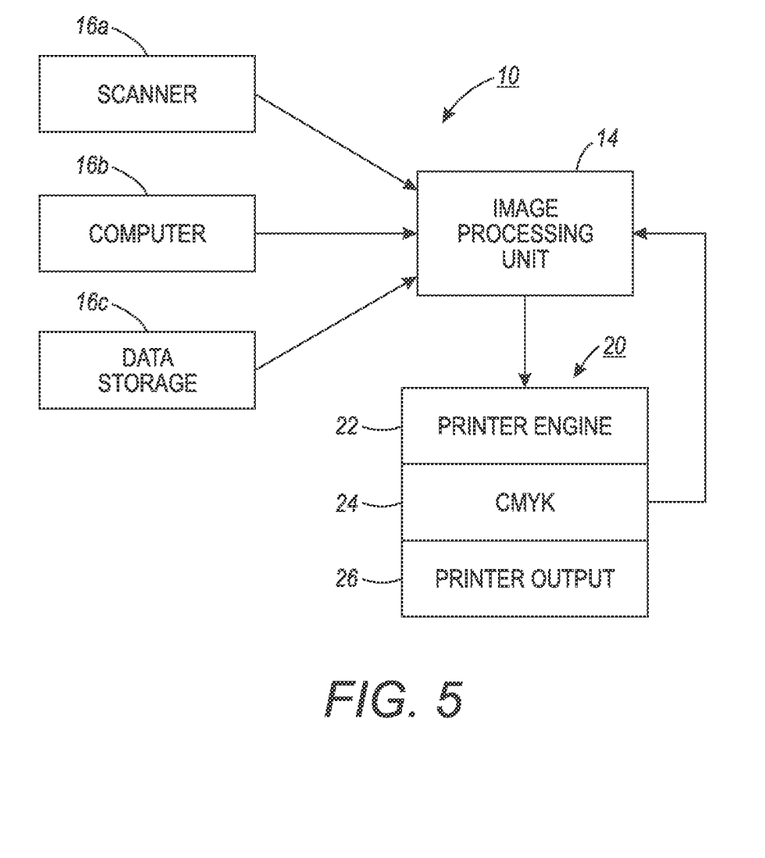
FIG. 5 discloses an image processing system for implementing a variable data image watermarking method in accordance with the present development.

The system and method in accordance with the present development are preferably implemented in an image processing and printing system such as most commercially available multi-colorant ("color") printer that have a different IR response of the different multi-colorant separations, and which can be provided as part of a printing and/or reproduction apparatus. Typically, the printer implements a CMYK color space and includes a xerographic printer engine although the present development is applicable to other printing methods such as ink-jet, solid-ink (SIJ), gel-ink, etc. FIG. 5 discloses one example of an apparatus for implementing a method in accordance with the present development. The apparatus 10 comprises an image processing unit (IPU) 14 for carrying out the digital image processing operations disclosed herein, including the operations of the color transform processor CT and IR mark processor MP. The IPU 14 is defined by electronic circuitry and/or software that is dedicated to digital image processing and/or can comprise a general purpose computer programmed to implement the image processing operations disclosed herein. The IPU 14 is adapted to receive image data from a source such as a scanner 16a, computer 16b (e.g., a digital front-end (DFE)), and/or data storage 16c or another source that is part of the apparatus 10 and/or that is operably connected to the IPU 14 through a network or other means. For example, in one embodiment, the IPU 14 receives the CMYK data defining the input image I' from the computer 16b or storage 16c. The apparatus 10 comprises an image output or printing unit 20 including a xerographic, ink-jet, or other print engine 22 for printing the watermarked image I" on paper or another recording medium using the CMYK or other multi-colorant color space 24. The printer unit 20 further comprises a printed output station 26 for physical output of the final printed product such as printed paper or other recording media sheets. Examples of suitable commercially available systems 10 include, but are not limited to, the Phaser™, WorkCentre™, DocuColor™, iGenr™ and iGen4™ printing/copying/digital press systems available from Xerox Corporation.

Figure 6:
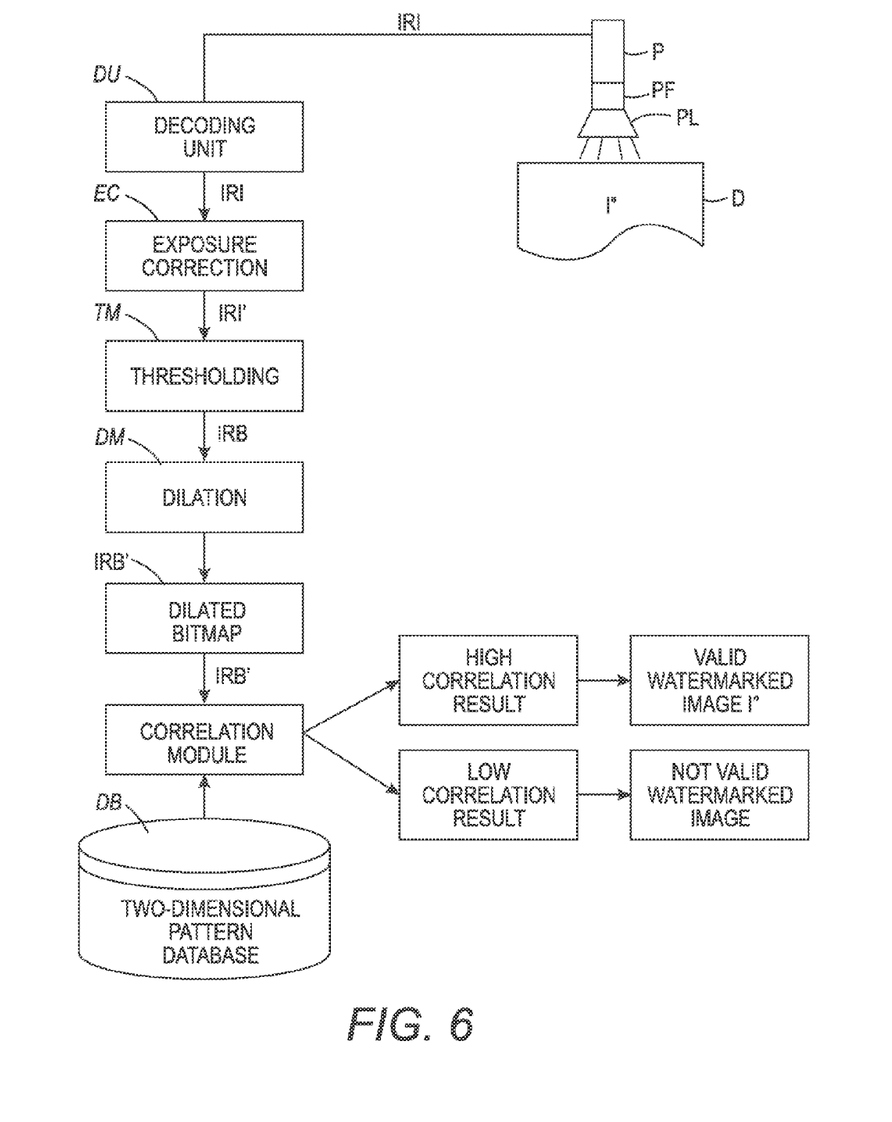
FIG. 6 discloses a method for decoding a variable data image watermark according to one embodiment of the present development.

FIG. 6 discloses a system and method for decoding a variable data image watermark according to one embodiment of the present development. A printed paper or other document D including (or suspected as including) the watermarked image I" is viewed or scanned in infrared lighting conditions using a IR viewing device such as an IR microscope or the like. In one example, a hand-held microscope P is fitted with IR (e.g.: 850 nanometer) LEDs PL and an IR pass filter PF. The microscope P has a field of view of x millimeters by y millimeters. As noted above, the IR mark portion IRM of an embedded IR mark is designed to fit entirely within this field of view of the microscope P and to be repeated in a periodic toroidal pattern in the watermarked image I" such that if the document D includes the watermarked image I", the IR mark portion IRM will be present within the field of view of the microscope P for any portion of the document D viewed with the microscope.

The document D is illuminated with IR light from the LEDs PL of the microscope P and the microscope P captures an IR image through the IR pass filter PF. The microscope P outputs the captured IR image data IRI to a decoding unit DU. The decoding unit DU can be provided by the same image processing unit 14 described above, but can also be provided by another digital image processing device such as electronic circuitry and/or software that is dedicated to digital image processing and/or a general purpose computer programmed to implement the decoding operations disclosed herein. The decoding unit includes an exposure correction module EC that corrects the exposure the IR image received from the microscope P to account for uneven illumination within the field of view due to the location of the IR LEDs. In one embodiment, the exposure correction module EC corrects the exposure based upon prior empirical measurements of the IR illumination field within the field of view of the microscope. Alternatively, a simplified exposure correction profile is used based upon assumption of the actual IR illumination within the microscope field of view, e.g., that the IR illumination will be most intense adjacent each LED and will deteriorate moving away from each IR LED. It is understood that balancing the local K amount K" actually leads to an IR signal of locally higher contrast, facilitating exposure control and decoding. The decoding unit further comprises a thresholding module TM that receives the exposure corrected infrared image data IRI' from the exposure correction module EC and performs a thresholding operation thereon to binarize the image data, i.e., to set to full white or "off" any pixels that do not have a grayscale value that is at least equal to a threshold value (e.g., 50% black after the above exposure correction processing) or a grayscale value of 128 for a bit-depth of 8) and to set to full black or "on" any pixels that have a grayscale value at or above the threshold. The thresholding module TM outputs a bitmap IRB of the image IRI' received from the exposure correction module EC. The decoding unit DU further comprises an optional dilation module DM that performs a dilation operation on the bitmap image data IRB received from the threshold module TM. As in generally known in image processing, a dilation image processing operation has the effect of setting to "on" or black any white or "off" (background) pixel that has a neighboring pixel that is a black or "on" (foreground) pixel, with the net effect that the black (foreground) regions grow and the white (background) regions shrink.

The dilated bitmap IRB' output by the dilation module DM is input to a correlation module CM that performs a correlation operation to determine if the dilated bitmap IRB' includes at least one occurrence of the embedded IR mark portion IRM. In one example, all possible IR mark portions (all possible two-dimensional Gold codes or other patterns) corresponding respectively to all possible numerical values that can possibly be encoded as an IR mark portion for a particular application are prestored in a database DB or other location and are accessed by the correlation module CM for comparison against the dilated bitmap IRB'. As noted above, an embedded IR mark portion IRM will exhibit the properties of maximized autocorrelation and minimized crosscorrelation. As such, if the dilated bitmap IRB' includes a valid IR mark portion IRM found in the database DB, the correlation module CM will output a high correlation result value indicating that the document D includes a valid watermarked image I", otherwise the correlation module CM will output a low correlation result value indicating that the document D does not include a valid watermarked image I". The correlation module CM optionally associates a valid IR mark portion IRM with a corresponding number or number sequence that is visually output to a user using a visual display, printer, or other visual output means, and the user is able to compare this number or number sequence with a number or number sequence visibly printed on the document D (e.g., a ticket number or serial number) to determine if the visual number or number sequence matches the number or number sequence output by the correlation module CM.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others, and the claims are intended to be construed as broadly as possible while maintaining their validity.

The invention claimed is:

1. A variable data image watermarking method comprising:
   receiving input image data that define an input image in terms of RGB data defining a red (R) color separation, a green (G) color separation, and a blue (B) color separation;
   performing a color transform on said RGB data to a CMYK image defining a cyan (C), magenta (M), yellow (Y) and black (K) separation, to define a constant K image that corresponds in appearance to said input image and that includes a constant K black color separation K';
   receiving variable infrared (IR) mark data defining an IR mark to be embedded in the constant K image;
   defining a watermarked black separation K" by embedding a sparse two-dimensional pattern of black pixels into said constant K black separation K', wherein said sparse two-dimensional pattern of black pixels corresponds to said received variable IR mark data and is defined with a density of black pixels that is less than or equal to a threshold T;
   correcting local neighborhood values in the watermarked black separation K", excluding the black pixels corresponding to said received variable IR mark, to maintain local average black levels;
   said color transformed cyan, magenta, and yellow color separations C, M, Y and said watermarked black separation K" defining a watermarked image; and,
   generating a watermarked document by printing said watermarked image on paper using a multicolorant printer.

2. The variable data image watermarking method as set forth in claim 1, wherein said variable IR mark data comprises a pseudorandom binary sequence, and wherein said method further comprises using said pseudorandom binary sequence to derive said sparse two-dimensional pattern of black pixels that corresponds to said pseudorandom binary sequence.

3. The variable data image watermarking method as set forth in claim 2, further comprising using said pseudorandom binary sequence to derive a Gold code binary sequence represented by said sparse two-dimensional pattern of black pixels, wherein said Gold code binary sequence comprises the properties of:
   maximized autocorrelation; and,
   minimized crosscorrelation.

4. The variable data image watermarking method as set forth in claim 1, wherein said black separation K' of said constant K image I' comprises a density of black pixels that is less than or equal to said threshold T.

5. The variable data image watermarking method as set forth in claim 4, wherein said density of black pixels in said sparse two-dimensional pattern is less than or equal to said density of black pixels in said black separation of said constant K image I'.

6. The variable data image watermarking method as set forth in claim 5, wherein said sparse two-dimensional pattern comprises a plurality of identical IR mark portions arranged relative to each other in a toroidal periodic pattern in both horizontal and vertical directions.

7. The variable data image watermarking method as set forth in claim 6, wherein said IR mark portion is intended for viewing with an IR viewing device defining a field of view having a horizontal and vertical dimensions, and wherein said period of said toroidal periodic pattern in said horizontal direction is less than said horizontal field of view dimension and said period of said toroidal periodic pattern in said vertical direction is less than said vertical field of view dimension.

8. The variable data image watermarking method as set forth in claim 5, wherein said sparse two-dimensional pattern of black pixels comprises a plurality of elements, each of said elements comprising a plurality of pixels including at least one black central "on" pixel surrounded by a border of white "off" pixels that provide contrast to the black central "on" pixels.

9. The variable data image watermarking method as set forth in claim 8, wherein said step of embedding said sparse two-dimensional pattern of black pixels into said constant K black separation K' comprises embedding each of said elements of said IR mark portion into said constant K black separation K' by overwriting correspondingly located pixels of said constant K black separation K' with said pixels defining each of said elements.

10. The variable data image watermarking method as set forth in claim 9, wherein each of said elements of said sparse two-dimensional pattern defines a black pixel density approximately equal to said threshold.

11. The variable data image watermarking method as set forth in claim 10, wherein said threshold $T \leq 15\%$.

12. The variable data image watermarking method as set forth in claim 1, further comprising a decoding process comprising:
   using an IR viewing device to derive an IR image of said watermarked document by illuminating said watermarked document with an IR light source and capturing an IR image of said watermarked document through an IR pass filter;
   performing a correlation operation on said IR image to determine if the IR image captured by the IR viewing device includes at least one occurrence of said embedded sparse two-dimensional pattern of black pixels.

13. The variable data image watermarking method as set forth in claim 10, wherein said decoding process further comprises an exposure correction step in which an exposure correction operation is performed on said IR image captured by said IR viewing device to adjust said IR image to account for uneven illumination of said watermarked document by said IR light source, wherein said exposure correction operation outputs an exposure corrected IR image.

14. The variable data image watermarking method as set forth in claim 13, wherein said decoding process further comprises a thresholding step in which said exposure corrected IR image is subjected to a thresholding operation that binarizes the IR image to define a bitmap of said IR image.

15. The variable data image watermarking method as set forth in claim 14, wherein said decoding process further comprises a dilation step in which said bitmap of said IR image is subjected to a dilation operation that increases the size of black regions in said bitmap relative to a background of said bitmap.

16. The variable data image watermarking method as set forth in claim 12, wherein said IR viewing device comprises a microscope comprising an IR light source to illuminate a watermarked document and an IR pass filter through which an IR image of said watermarked document is captured.

17. The variable data image watermarking method as set forth in claim 1, wherein:
   said black separation K' of said constant K image I' comprises a density of black pixels that is equal to a threshold T; and,
   said sparse two-dimensional pattern of black pixels is defined with a density of black pixels that is less than or equal to said threshold T.

18. The variable data image watermarking method as set forth in claim 17, wherein said sparse two-dimensional pattern of black pixels comprises a plurality of elements, each of said elements comprising a plurality of pixels including at least one black central "on" pixel surrounded by a border of white "off" pixels that provide contrast to the black central "on" pixels.

19. The variable data image watermarking method as set forth in claim 18, wherein each of said elements of said sparse two-dimensional pattern defines a black pixel density approximately equal to said threshold T.

* * * * *